UNITED STATES PATENT OFFICE.

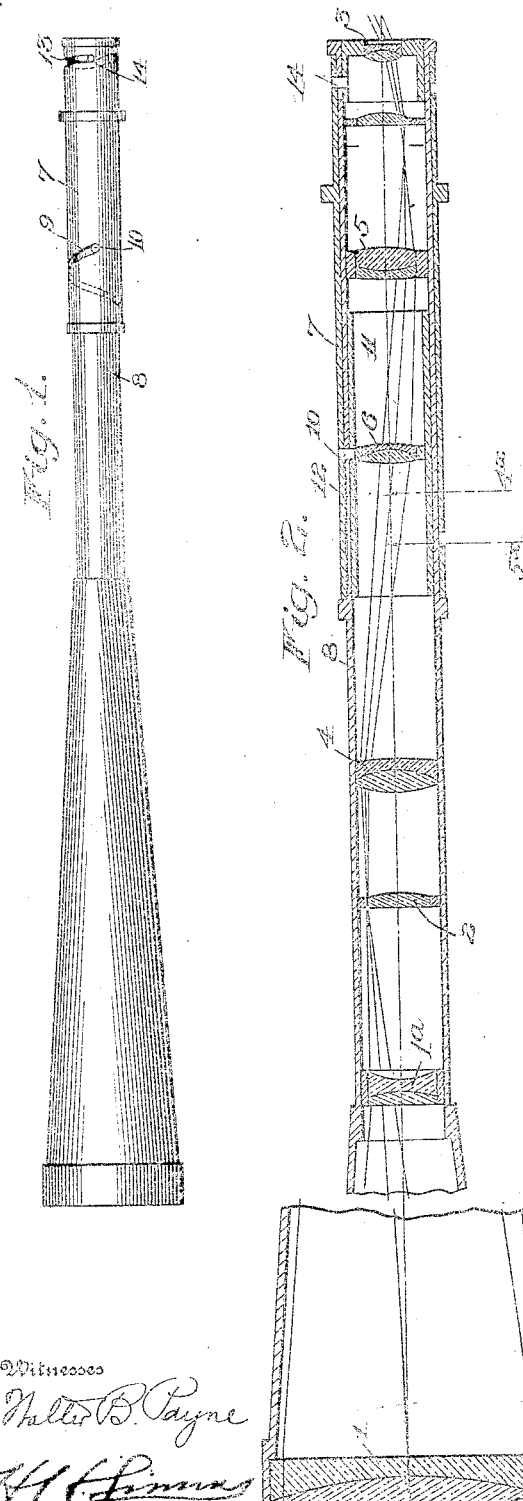

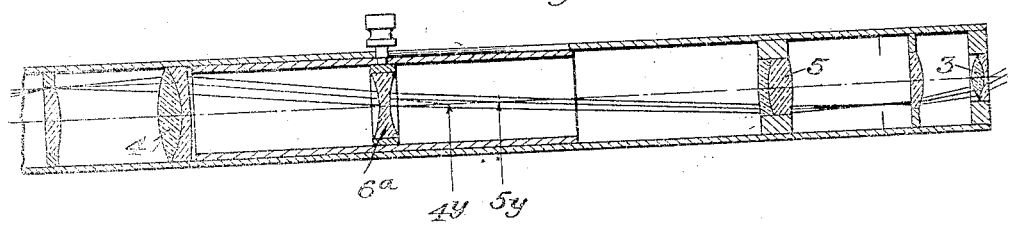
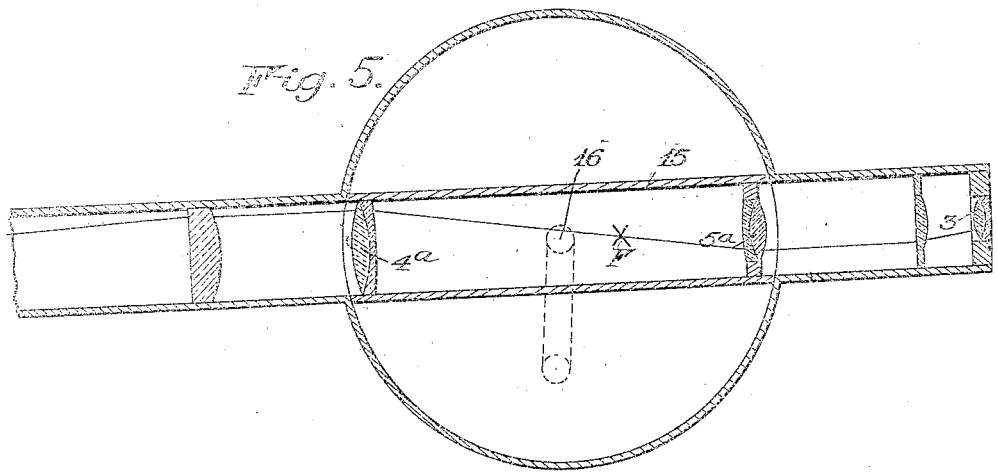
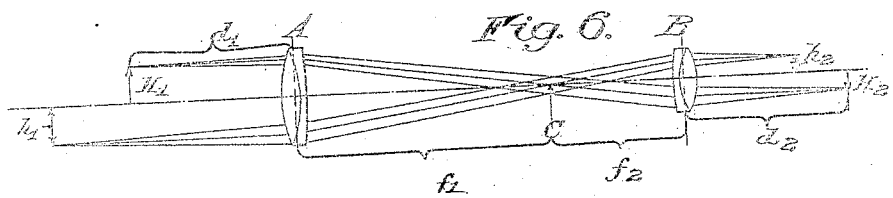

GUSTAV A. HERMANN KELLNER, OF ROCHESTER, NEW YORK, ASSIGNOR, BY MESNE ASSIGNMENTS, TO BAUSCH & LOMB OPTICAL COMPANY, OF ROCHESTER, NEW YORK, A CORPORATION OF NEW YORK, (NO. 2.)

TERRESTRIAL TELESCOPE.

936,541.

Specification of Letters Patent. Patented Oct. 12, 1909.

Application filed August 2, 1907. Serial No. 386,693.

*To all whom it may concern:*

Be it known that I, GUSTAV A. HERMANN KELLNER, of Rochester, in the county of Monroe and State of New York, have invented certain new and useful Improvements in Terrestrial Telescopes; and I do hereby declare the following to be a full, clear, and exact description of the same, reference being had to the accompanying drawings, forming a part of the specification, and to the reference characters marked thereon.

The present invention relates to terrestrial telescopes, that is, telescopes employing an objective in combination with an erecting system which erects the image formed by the objective, and an eyepiece to accommodate the eye in looking at the image thus produced; one object being to provide a construction in which two different powers or magnifications free from distortion may be obtained without varying the length of the telescope or changing the location of the exit pupil, and another object being to provide for other magnifications.

In the drawings:—Figure 1 is a side view of a telescope constructed in accordance with my invention, in which one form of telescopic erecting system is employed. Fig. 2 is a longitudinal section of the same telescope showing the adjustment for one magnification. Fig. 3 is a like view showing the adjustment for another magnification. Fig. 4 illustrates an embodiment of my invention in which another form of telescopic erecting system is employed. Fig. 5 illustrates an embodiment in which the telescopic system is rotatable; and Fig. 6 is a diagrammatic view of a telescopic system.

In this invention there is employed an objective which may be of the kind used for telephoto work consisting of a collective and a dispersive element 1 and 1ª respectively, to obtain a great focal length and retain shortness of the structure. It is preferably made telecentric with reference to its image side by placing in or near its focus a collective lens, whose facing focus falls on the exit pupil of the objective. If desirable, the collective lens may be placed so that one of its surfaces, which can be provided with a cross hair or micrometer, falls into the image formed by the objective. By this arrangement the principal rays which cross in the center of each pupil of the objective and which form the axes of the pencils coming from the object, are caused to run parallel to the optical axis of the telescope. Combined with these parts is an erecting system having means for varying the power of the telescope without varying the distance between the system and the objective preferably in the form of a telescopic system with the common focal point of its lenses shiftable to vary the power of the telescope, without changing the distance between the system and the objective, or between the system and a suitable eyepiece 3.

As is well known, an ordinary telescopic system employs two lenses A and B (Fig. 6) having their focal points coinciding at C so that a ray running parallel to the optical axis, for instance, in a distance $h_1$ will pass through lens A, then through the common focus C, and through lens B, leaving the latter parallel to the optical axis in a distance $h_2$. The ratio of the distances from the axis in which the ray runs before entering and after leaving the system, is the magnification of the system and is equal to the ratio of the focal distance of the component lenses, i. e.:

$$M = \frac{h_2}{h_1} = \frac{f_2}{f_1}$$

This magnification is constant in all pairs of conjugate image planes, no matter what their distance is from the system, and as can be proved easily there are only two conjugate image planes, one on each side of the system which are at equal distances from the outside of the lenses. For instance, if an object $H_1$ (Fig. 6) be moved toward the lens A the image $H^2$ will move away from lens B and at a certain position of $H_1$ the distance ($d^2$) of the image from the lens B will be just as great as the distance $d'$ from the lens A. If now the object $H_1$ be maintained in its place and the whole system is reversed so that the lens B will be exactly in the position of lens A there can be obtained a sharp image in the same position as before, only the magnification is changed to $\frac{f_1}{f_2}$ It will be seen from the foregoing that a telescopic system may be advantageously employed as an erecting system for obtaining different powers in terrestrial telescopes if the common focal point of the system be shifted relatively to an objective. This can be accomplished in numerous ways. For instance, in Figs. 2 and 3, I employ a pair of fixed lenses 4 and 5 separated by a distance different from their focal distances, in this instance less than their focal distances, the focal points being at $4_x$ and $5_x$ respectively. Arranged between the lenses is a lens 6 preferably a collective lens which is movable to form an optical combination with either lens 4 and 5 so as to deflect the rays of one lens and have the focus of the combination fall exactly in the focus of the other lens, the adjustment for one power being shown in Fig. 2, and for the other power being shown in Fig. 3. In Fig. 4 the distance between the lenses 4 and 5 is also different from their focal distances, in this instance being greater, so that the focal points lie at $4_y$ and $5_y$. Instead of a collective lens a dispersing lens $6^a$ is employed and forms a combination with either lens to shift the common focus to either point. In both of these embodiments it is also possible to secure other magnifications by shifting the movable lens and providing a slight relative adjustment between the erecting system and one of the other optical parts of the telescope, as for instance, by slightly adjusting the eye piece. For this purpose it is preferable to provide a connection between the movable lens and the eye piece whereby the adjustment of the lens will effect the proper adjustment of the eyepiece. In the embodiment shown, this connection is in the form of a sleeve 7 surrounding the tube 8 to which the optical parts of the telescope are secured and having a cam slot 9 the wall of which engages a projection 10 on the tube 11 carrying the adjustable lens. Upon the rotation of the sleeve the projection 10 is caused to move in a longitudinal slot 12 in the tube 8 and the eyepiece is moved by a cam groove 13 formed in the sleeve and engaging a projection 14 on the eyepiece, the groove 13 being so shaped that in both extreme positions of the adjustable lens the eyepiece will lie in the same position. The shifting of the common focal point of the telescopic system can be obtained also by rotating the telescopic or erecting system in the manner shown in Fig. 5. Here the lenses $4_a$ and $5_a$ have a common focus F and are mounted within a suitable casing 15 rotatable about an axis 16 so as to position either lens $4_a$ or $5_a$ toward the object and thus shift the common focus.

It will be apparent from the foregoing that I have provided a terrestrial telescope in which it is possible to obtain two different magnifications without varying the length of the telescope, as the distances between the erecting system and the objective and between the erecting system and eyepiece are constant and that magnifications between these two may be obtained by only a slight variation in the length of the telescope. This construction is particularly advantageous for use with ordnance, for the reason that it can be quickly manipulated to sight an object and is less liable to become deranged by shocks due to firing. It may be further stated, that since in this combination of a telescopic erecting system with an objective of the kind described, the principal rays run parallel to the optical axis before entering the erecting system and at least for the two extreme magnifications also leave the erecting system parallel to the optical axis, the conditions which would create distortion of the image are strictly the same and if the distortion is done away with for one magnification, the image will also be free from distortion for the other magnification. And for the magnification between the two extremes the inclination of the principal rays to the optical axis after leaving the erecting system is small enough as not to cause any notable distortion.

I claim as my invention:

1. In a terrestrial telescope, the combination with an objective and a collective lens arranged so that the exit pupil of the objective falls in its focus, of a telescopic system arranged to erect the image formed by the objective.

2. In a terrestrial telescope, the combination with an objective and a collective lens arranged so that the exit pupil of the objective falls in its focus, of a telescopic system arranged to erect the image formed by the objective and having means for varying the power of the telescope.

3. In a terrestrial telescope, the combination with an objective and a collective lens arranged so that the exit pupil of the objective falls in its focus, of a telescopic system arranged at a constant distance from the image formed by the objective to erect said image, and having the common focal point of its lenses shiftable relatively to the image to vary the power of the telescope.

4. In a terrestrial telescope, the combination with an objective, a collective lens arranged so that the exit pupil of the objective falls in its focus, and an eyepiece, of a telescopic system arranged between the eyepiece and the collective lens to erect the image and having the common focal point of its lenses shiftable to vary the power of the telescope without changing the distance between the system and the eyepiece and the objective.

5. In a terrestrial telescope, the combination with an eyepiece and an objective, of an erecting system arranged between them, embodying two lenses having a common focus, and means for shifting this common focal point relatively to the objective without varying the distance between the lenses or the distance of the erecting system from the objective.

6. The combination with an objective and a collective lens arranged so that the exit pupil of the objective falls in its focus, of an erecting system embodying a pair of fixed lenses separated by a distance different from the sum of their focal distances, and a lens arranged between the fixed lenses and movable to form an optical combination with either of said fixed lenses, the focus of the combination falling in the focus of the other fixed lens.

7. In a terrestrial telescope the combination with an objective and an eyepiece, of a telescopic erecting system, having a shiftable common focal point and means providing a relative adjustment between the erecting system and one of the other parts to vary the power of the telescope.

8. In a terrestrial telescope, the combination with an objective and an eyepiece of a telescopic erecting system having means shiftable to obtain two different magnifications, and an eyepiece having connection with said means whereby it is adjusted therewith to obtain other magnifications.

9. The combination with an objective and a collective lens arranged so that the exit pupil of the objective falls in its focus, of an erecting system embodying a pair of fixed lenses separated by a distance different from the sum of their focal distances, a lens arranged between the fixed lenses and movable to form an optical combination with either of said fixed lenses, the focus of the combination falling in the focus of the other fixed lens, and an eyepiece having connection with the movable lens producing an adjustment of the eyepiece when the lens is adjusted, to obtain other magnifications.

GUSTAV A. HERMANN KELLNER.

Witnesses:
HAROLD H. SIMMS,
RUSSELL H. GRIFFIN.